M. DEACON & W. GORE.
FILTERING APPARATUS.
APPLICATION FILED JAN. 30, 1914.
1,123,704.
Patented Jan. 5, 1915.
2 SHEETS—SHEET 1.
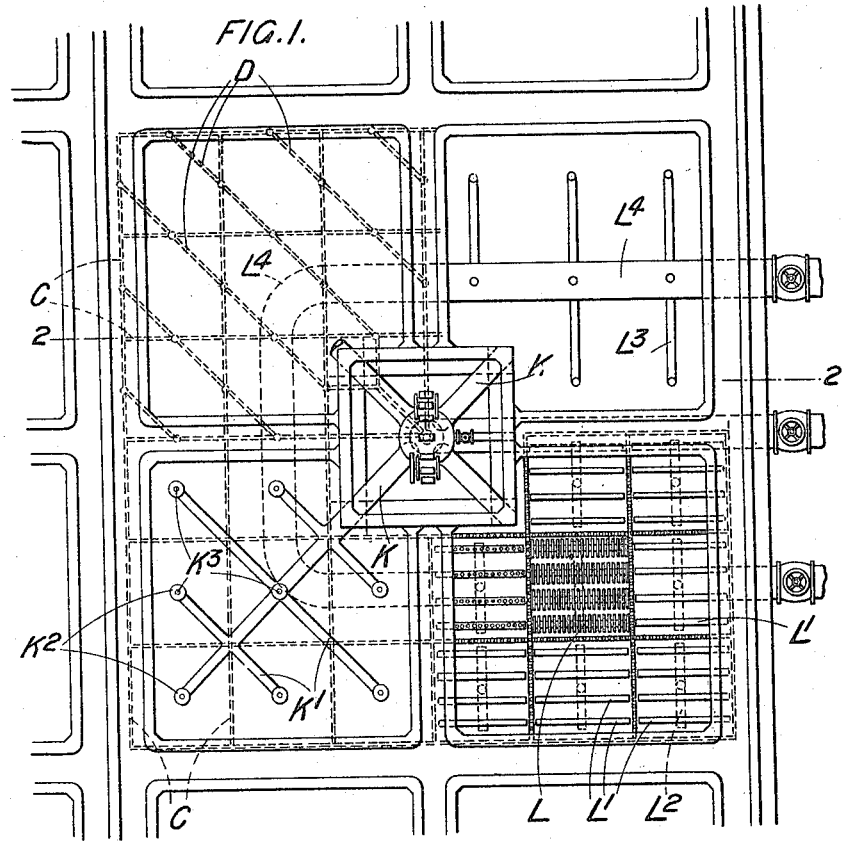
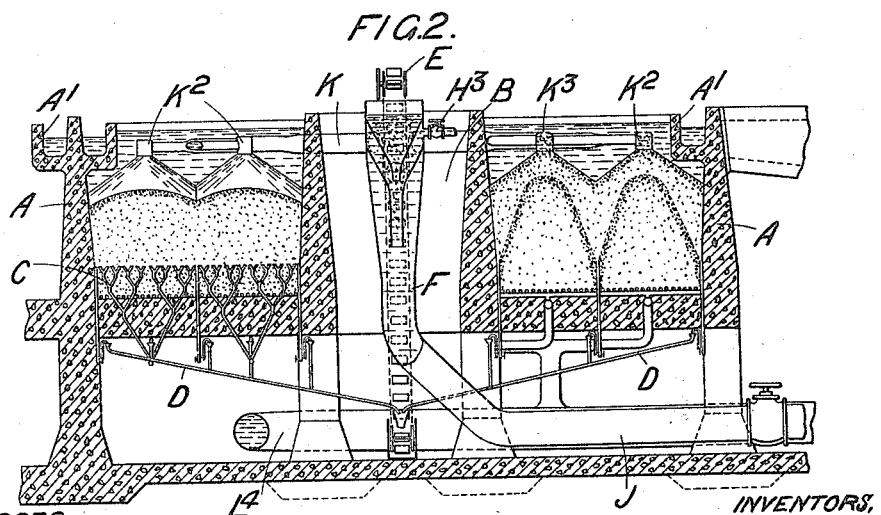

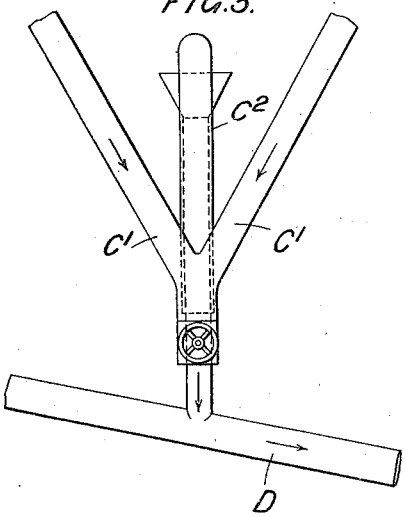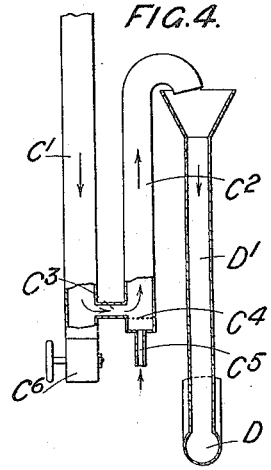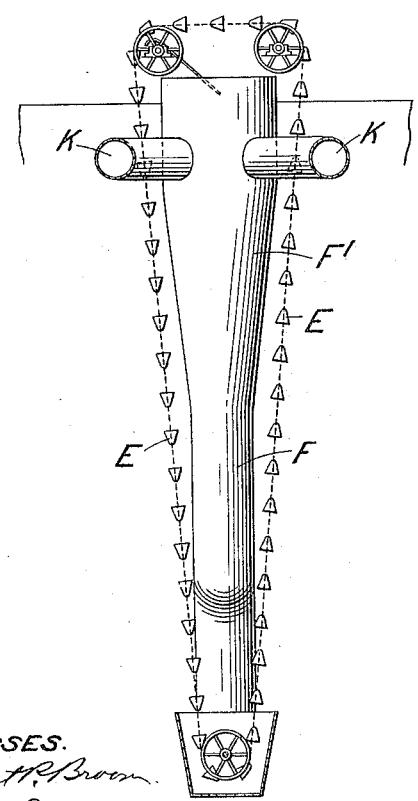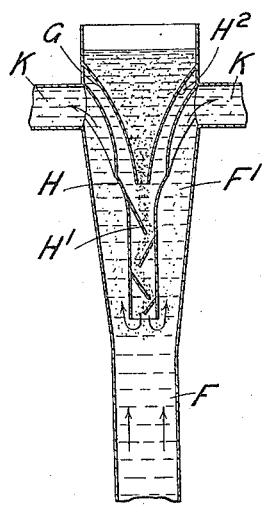

UNITED STATES PATENT OFFICE.

MARTIN DEACON AND WILLIAM GORE, OF LONDON, ENGLAND.

FILTERING APPARATUS.

1,123,704.   Specification of Letters Patent.   Patented Jan. 5, 1915.

Application filed January 30, 1914.   Serial No. 815,548.

*To all whom it may concern:*

Be it known that we, MARTIN DEACON and WILLIAM GORE, subjects of the King of England, and both residing at London, in England, have invented a certain new and useful Filtering Apparatus, of which the following is a specification.

This invention relates to apparatus for filtering water and other liquids and has particular reference to filters wherein the sand or other finely divided filtering medium is transferred, during the operation of the filter, from one part of the filtering mass to another, such sand being washed during its transference.

The present invention relates particularly to filters intended for dealing with large quantities of water, its object being the construction of efficient filtering plant which shall occupy comparatively little space and while having the effect of a large number of separate small filters shall not have the mechanical partitions or boundary walls which separate filters would necessitate.

In a filter according to this invention the area of the filtering mass is divided into a number of filter units each having pipes for extracting the sand and each provided with a pipe through which the washed sand is returned and the water to be treated is fed.

Each unit thus formed will act as a separate filter, although there is no mechanical boundary or partition between adjacent units such as would make each unit a separate mechanical entity.

The shape and construction of the improved filter may vary to suit particular requirements, the areas of the separate units being correspondingly mapped out or defined by the disposition of the sand-extracting pipes which are so disposed as to surround the margin of the base of the filtering mass constituting each unit. For instance, if the filter as a whole is of square section then each unit is conveniently square, the sand-extracting pipes being arranged in the form of squares. Or again, the filter as a whole might be of circular or annular shape in plan, the units being of segmental form.

The sand-extracting pipes are preferably bifurcated or branched several times so that while there are many pipes at the level at which the sand is to be extracted, there are but few pipes at a lower level where the sand passes away. At these points some suitable device may be provided to assist the flow of the sand, one such device being hereinafter described.

The sand extracted from each of the unit filters is caused to pass to some common point preferably near the center of the filtering apparatus as a whole. Here the sand enters a conveyer and is carried to washing apparatus and after treatment in this apparatus the washed sand is carried by the water to be treated through distributing pipes. These distributing pipes are branched and so arranged that each unit filter has washed sand and the water to be treated delivered over its center.

After the water has been filtered it is withdrawn through perforated pipes extending over the area of the base of each section. These pipes are joined to other pipes fewer in number and larger in diameter so that finally the filtered water is collected in a few large pipes which lead to the reservoir or main.

In the accompanying drawings which illustrate by way of example one construction of filtering apparatus according to this invention, Figure 1 is a plan having portions removed to show the underlying apparatus. Fig. 2 is a vertical section partly on the line 2—2 of Fig. 1. Figs. 3 and 4 are elevations taken at right angles to each other of the sand-extracting apparatus. Fig. 5 is an elevation of the sand-washing apparatus, and Fig. 6 a vertical section through a portion of the sand washer. Figs. 3, 4, 5 and 6 are drawn to a larger scale than Figs. 1 and 2.

In the construction illustrated the sand or other filtering medium is contained in square pits or reservoirs within concrete walls A preferably below the ground level. The filter as a whole is square and is divided into four sections surrounding a square central pit B containing a conveyer and the sand-washing apparatus.

The filtering medium in each of the four large sections is provided with a number of branched or bifurcated pipes C which map out the filtering mass into a series of filter units whose boundaries are defined by the bifurcated pipes. It will be seen from Fig. 1 that the pipes C are arranged so as to inclose squares and each of these squares may be regarded as the base of a filter unit. The pipes C are grouped in any convenient manner so that a number of them, for instance those forming one side of each of the squares, lead into a common pipe D. There may be several of these pipes D to each large section of the filter as is indicated in the top left hand section of Fig. 1 and each of the pipes D leads either separately or by means of a common pipe to an elevator or conveyer E in the pit B.

The connection between the pipes C and D is preferably through some form of sand-extracting device illustrated on a larger scale in Figs. 3 and 4. In these figures the pipes $C^1$ represent the junction of a group of bifurcated pipes C and may be regarded as forming one leg of a U-shaped pipe whose other limb is constituted by the vertical pipe $C^2$. The top of this pipe is turned over to form a nozzle directed into the funnel mouth of a pipe $D^1$ leading down to one of the pipes D.

The connection between the bottom of the pipes $C^1$ and the pipe $C^2$ is by means of a transverse tube $C^3$ of comparatively small cross-section and just below the level of this tube $C^3$ in the pipe $C^2$ is a screen $C^4$ to prevent sand which passes down the pipes $C^1$ through the tube $C^3$ into the pipe $C^2$ from access to a water inlet $C^5$. This inlet is connected to some source of water under slight pressure and the water entering the inlet $C^5$ passes up through the screen $C^4$ and keeps the sand in the limb $C^2$ "alive," that is, in a condition in which it will readily flow. Consequently the sand and water from the pipes $C^1$, that is from the bifurcated pipes C, pass up through the pipe $C^2$, down the pipe $D^1$ and away to the washer through the pipe D. This construction is very convenient where the filtering mass is divided into many units as the water inlet pipes may all be connected to one or more common pipes and if a cock in this common pipe be turned off, the outlet of sand from all the filter units is simultaneously stopped, for when the water no longer enters the pipes $C^2$ the sand clogs and does not flow and hence no more sand can pass out of the bifurcated pipes C. Beneath the pipes $C^1$ is an outlet closed by a cock $C^6$ which may be opened to clear the pipes should any obstruction occur.

The mixture of water and sand flowing down the pipes D (Fig. 2) enters the buckets of the conveyer E and is carried up by them and discharged into the mouth of the sand-washing apparatus which is shown in section in Fig. 6. By reference to that figure it will be seen that the apparatus comprises a vertical pipe F with an enlarged conical or tapered end $F^1$. Into this end or mouth are fitted two hopper-like funnels G and H the neck of the lower funnel H extending some distance down the pipe F and being provided with baffles $H^1$. The water to be filtered or some portion of it passes up through this pipe F from a main J and the sand and water brought up by the buckets of the conveyer E is shot into the mouth of the funnel G. It sinks through this hopper being partially washed during its progress and then passes through the neck of the hopper G into the lower hopper or funnel H. As it passes down through the neck of this funnel H its progress is impeded to some extent by the baffles $H^1$ and it meets a rising current of water coming up from the pipe F. By the time the sand has reached the bottom of the neck of the funnel H it is clean and, meeting a comparatively strong current of water passing up the enlarged mouth of the pipe F outside the neck of the funnel H, it is carried up with the current and enters main distributing pipes K which communicate with the spaces between the funnel H and the enlarged mouth of the pipe F. The impurities and dirty matter removed from the sand pass up within the neck of the funnel H and then continue up through the annular space within the funnel H but outside the neck of the funnel G and are discharged through an opening $H^2$ and cock $H^3$ to waste through gutters $A^1$ formed in the concrete walls A.

As will be seen from Fig. 1 the pipes K lead into branch distributing pipes $K^1$ terminating in boxes or nozzles $K^2$ one of these nozzles being situated centrally over each of the filter units. It is to be understood that although the distributing pipes K and $K^1$ are only shown in the lower left hand section of Fig. 1 a similar arrangement would be provided for the other sections but the pipes in question are removed from the drawing so that other underlying parts may be shown.

The washed sand passes out through the distributing nozzle or box $K^2$ and is returned to the top of the filtering mass of each filter unit. As in other filters of this type i. e. filters in which the washed sand is returned to a central point above the filtering mass during the operation of the filter, a cone of comparatively stationary sand is formed in each filter unit somewhat for example as indicated in the right hand portion of Fig. 2 and the main paths of motion of the sand lie outside this cone so that the moving sand finds its way to the ends of the bifurcated pipes C and is removed, washed and returned. Thus it will be seen that each of the filter units performs the functions of a separate filter although many units may be contained in the one large mass of filtering material.

Each of the boxes or nozzles $K^2$ is preferably provided with a small hole or vent $K^3$ so that if for any reason too much sand passes through any one branch and the cone of sand beneath the box mounts up and clogs it, there may still be an opportunity for the water to pass through and out at the hole at the top. In such a case the amount of water passing through the particular branch is lessened, consequently less washed sand is brought along and matters soon right themselves for the sand-extractors continue at work and consequently the proper level is again restored.

The filtered water having passed through the filtering mass passes out from the bottom of each filter unit through a number of small pipes L which practically cover the base of each unit. These pipes L are shown in one of the units in the right hand bottom section of Fig. 1 and it will be understood that similar pipes are provided in all the units.

The pipes L are preferably perforated and they communicate with other pipes $L^1$. These pipes in their turn are joined to pipes $L^2$ which are connected through pipes $L^3$ to a main $L^4$. It will be appreciated that the size and disposition of these collecting pipes may be varied to suit the requirements under which the filter is designed to work.

Various other alterations in the disposition and shape of the pipes and other parts of the filtering apparatus may be made without departing from the spirit of this invention the arrangement described and illustrated being merely by way of example.

What we claim as our invention and desire to secure by Letters Patent is:—

1. In a filter the combination with the sand or other filtering material of pipes for extracting the sand and means for returning the washed sand and the liquid to be filtered the extraction pipes and the return pipes being so disposed and arranged that a number of filter units are formed in the one mass of filtering material as set forth.

2. In a filter the combination of a container or casing forming the wall of the filter, a mass of sand or other filtering material contained therein and comprising a plurality of filter units, sand-extracting means for each unit, a sand-washing device common to the units, means for distributing the washed sand to the units with the liquid to be filtered and means for withdrawing the filtered liquid.

3. In a filter the combination of a mass of sand or other filtering material a plurality of bifurcated or branched pipes dividing the said mass into a number of filter units sand extractors connected to the bifurcated or branched pipes, a sand-washing device common to the units, means for distributing the washed sand to the units with the liquid to be treated and means for withdrawing the filtered liquid.

4. In a filter the combination of a mass of sand or other filtering material a plurality of sand-extracting pipes dividing the said mass into a number of filter units, sand extractors for said pipes each comprising a U-shaped pipe having an inlet for water at the bottom of one limb, a sand-washing device common to the units means for distributing the washed sand to the units with the liquid to be treated and means for withdrawing the filtered liquid.

5. In a filter the combination of a mass of sand or other filtering material, a plurality of sand-extracting pipes dividing the said mass into a number of filter units, sand extractors for said pipes each comprising a U-shaped pipe having an inlet for water at the bottom of one limb, a sand-washing device comprising a vertical pipe up which the water to be filtered is fed, a hopper or funnel in the mouth of said pipe means for conveying the sand extracted from the filter units and delivering it into the hopper or funnel, distributing pipes terminating with a delivery opening centrally over each filter unit, conduits connecting said distributing pipes with the space in the vertical pipe outside the funnel or hopper, an outlet for the dirty water and means for withdrawing the filtered water.

6. In a filter the combination of a mass of sand or other filtering material, a plurality of sand-extracting pipes dividing the said mass into a number of filter units, sand extractors for said pipes each comprising a U-shaped pipe having an inlet for water at the bottom of one limb, a sand-washing device comprising a vertical pipe up which the water to be filtered is fed, two funnels or hoppers one below the other in the mouth of said pipe, means for conveying the sand extracted from the filter units and delivering it into the upper funnel or hopper, distributing pipes terminating with a delivery opening centrally over each filter unit, conduits connecting such distributing pipes with the space in the vertical pipe outside the lower funnel or hopper, an outlet for the dirty water and means for withdrawing the filtered water.

7. In a filter the combination of a mass of sand or other filtering material a plurality of sand-extracting pipes dividing the said mass into a number of filter units, sand-extractors for said pipes, a sand-washing device comprising a vertical pipe up which the water to be filtered is fed, two funnels or hoppers one below the other in the mouth of said pipe, means for conveying the sand extracted from the filter units and delivering it into the upper funnel or hopper, distributing pipes terminating with a delivery opening centrally over each filter unit, conduits connecting such distributing pipes with the space in the vertical pipe outside the lower funnel or hopper, an outlet for the dirty water and means for withdrawing the filtered water.

8. In a filter the combination of a mass of sand or other filtering material, a plurality of sand-extracting pipes dividing the said mass into a number of filter units, sand extractors for said pipes each comprising a U-shaped pipe having an inlet for water at the bottom of one limb, a sand-washing device comprising a vertical pipe up which the water to be filtered is fed, two funnels or hoppers one below the other in the mouth of said pipe, means for conveying the sand extracted from the filter units and delivering it into the upper funnel or hopper, distributing pipes terminating with a delivery opening centrally over each filter unit, conduits connecting such distributing pipes with the space in the vertical pipe outside the lower funnel or hopper, an outlet for the dirty water, a plurality of perforated pipes near the bottom of the filtering mass in each unit and connections between such pipes and a main by which the filtered liquid is withdrawn.

In testimony whereof we have signed our names to this specification in the presence of two subscribing witnesses.

MARTIN DEACON.

Witnesses:
JOHN REYNOLD TAYLOR,
BERNARD SAM. W. CRIMP.

WILLIAM GORE.

Witnesses:
HAROLD WORTHEY GZOWSKI,
NOEL ARTHUR MARSH.

Copies of this patent may be obtained for five cents each, by addressing the "Commissioner of Patents, Washington, D. C."